Jan. 5, 1937.  M. J. KWARTZ  2,066,983
PISTON RING
Filed Nov. 22, 1935
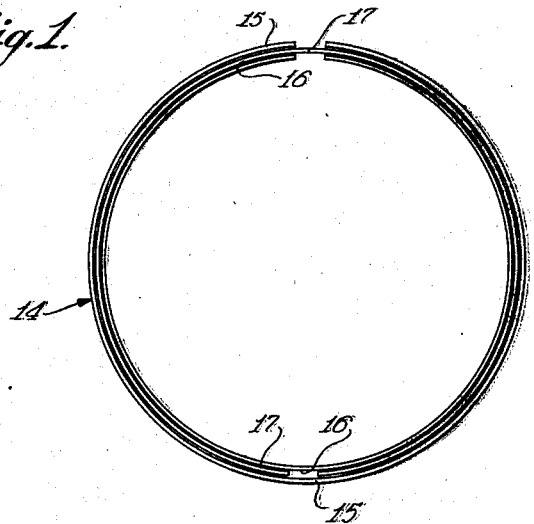
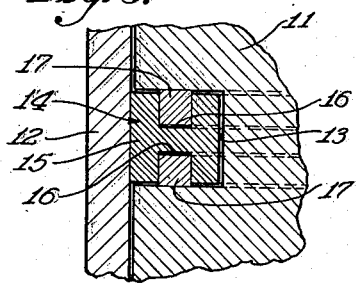
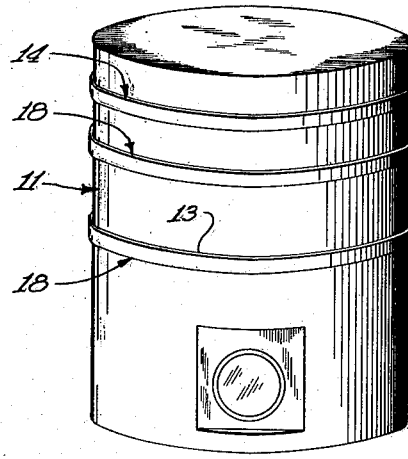
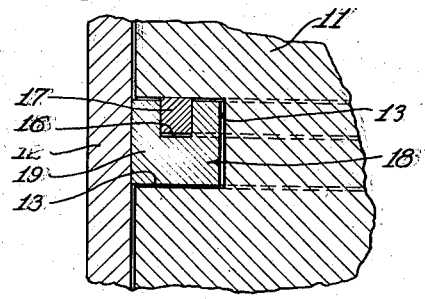
INVENTOR:
Michael J. Kwartz
BY
Rasmussen & Brugman
ATTORNEYS.

Patented Jan. 5, 1937

2,066,983

UNITED STATES PATENT OFFICE 2,066,983

PISTON RING

Michael Joseph Kwartz, Gary, Ind., assignor of one-half to Grace M. Trankla, Gary, Ind.

Application November 22, 1935, Serial No. 51,099

2 Claims. (Cl. 309—44)

This invention relates in general to piston rings for internal combustion motors, or the like, and more particularly to a ring which is so constructed as to eliminate axial movement thereof relative to the piston during operation of the latter.

A principal object of the invention is the provision of a metal piston ring comprising two or more component parts between which a film of oil will collect to maintain the ring firmly against the radial surfaces of its groove to prevent fluttering of the ring during operation of the piston.

Another important object of the invention is the provision of a split piston ring having an annular recess therein and a split metal ring insert in said recess of a higher co-efficient of expansion than the main ring to maintain the latter in close contact with the cylinder wall.

Numerous other objects and advantages of the invention will be apparent as it is better understood from the following description, which, when taken in connection with the accompanying drawing, discloses a preferred embodiment thereof.

In the drawing,

Figure 1 is a plan view of a piston ring embodying the features of the instant invention;

Fig. 2 is a perspective view of a piston incorporating a plurality of rings embodying the features of the invention;

Fig. 3 is a vertical sectional view through a portion of the cylinder, piston and piston ring, the latter having two separate insert rings; and Fig. 4 is a view similar to Fig. 3 showing a modified form of piston ring having one separate insert ring.

Referring more particularly to the drawing, reference numeral 11 indicates a piston of usual or well-known construction which is adapted to be mounted in any suitable manner for reciprocating movement within a cylinder 12 of an internal combustion motor, or the like. The piston 11 is provided with a plurality of axially spaced, circumferential grooves or channels 13, within each of which a piston ring is mounted for the purpose of effectively sealing the space between the piston and the cylinder wall 12.

The upper one of these rings is generally indicated by the reference numeral 14, and comprises a split main ring 15 having an annular groove or channel 16 substantially centrally located in each of its upper and lower surfaces. In each of these annular grooves 16 is mounted a split insert ring 17 which is of substantially the same cross-sectional dimensions as the groove.

When the main ring 15 and insert rings 17 are assembled together, as shown in Fig. 1, the resulting ring 14 normally assumes a greater diameter than that of the cylinder 12. Therefore, upon being spread to fit over the piston 11 and inserted into a groove 13, and upon being further compressed to fit into the cylinder 12, the ring 14 will have a definite tendency to expand to insure effective sealing of the space between the piston and the cylinder wall.

This expansive tendency may be increased when the motor is operating by using a metal having a higher co-efficient of expansion for the insert rings 17 than that of the metal used for the main ring 15. For example, the main ring 15 may be made of iron or steel, while an aluminum alloy is used in making the insert rings 17.

The remaining rings which are used with the piston 11 are indicated generally by reference numeral 18. These rings are identical to the ring 14, except that the main ring 19 thereof, which corresponds to the ring 15, is provided with but one annular groove 16 and associated insert ring 17.

When the rings 14 or 18 are in operative position, as shown in Figs. 3 and 4, there is a certain amount of clearance between the top and bottom or radially disposed surfaces of the rings 15 or 18 and the grooves 13. This clearance must be allowed in order to insert the rings in the grooves, and, in the ordinary type of ring, it results in movement of the ring axially of and relative to the piston, which is designated as fluttering of the ring.

The provision of the inserts 17, however, eliminates such fluttering. This is due to the fact that the instant construction allows oil to seep in and collect between the inner radial surfaces of the groove 16 and its associated insert ring 17 to maintain the latter tightly against the adjacent radial surface of the groove 13. With only the one insert ring 17, as shown in Fig. 4, the opposite radial surface of the ring 19 will similarly be maintained in engagement with its associated radial surface of the groove 13.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A metal packing ring for a piston which is mounted for movement within a cylinder, comprising a split main ring having an annular recess therein, and a split insert ring mounted in said recess, said insert ring being made of a metal having a higher co-efficient of expansion than the metal composing said main ring, whereby during operation of said piston said insert ring will insure fluid-tight contact between said main ring and the inner wall of said cylinder.

2. A metal packing ring adapted to be inserted in a circumferential groove in a piston which is mounted for reciprocating movement within a cylinder, comprising a split main ring having an annular channel of rectangular cross section in a radial surface thereof, and a split insert ring mounted in said channel and having substantially the same cross-sectional dimensions as the channel, whereby oil will be collected between the inner radial surfaces of said insert ring and said channel to force said insert and main rings apart radially of said piston to insure firm engagement between said packing ring and the radial walls of said groove during reciprocation of said piston, said insert ring being made of a metal having a higher co-efficient of expansion than the metal composing said main ring to insure fluid-tight contact between said main ring and the inner wall of said cylinder.

MICHAEL JOSEPH KWARTZ.